United States Patent
Lee et al.

(10) Patent No.: US 8,222,330 B2
(45) Date of Patent: Jul. 17, 2012

(54) POLYCARBONATE RESIN COMPOSITION HAVING GOOD FLAME RETARDANCY

(75) Inventors: Seon Ae Lee, Seoul (KR); Im Hyuck Bae, Youngin-si (KR); Beom Jun Joo, Seoul (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 12/968,894

(22) Filed: Dec. 15, 2010

(65) Prior Publication Data

US 2011/0160367 A1 Jun. 30, 2011

(30) Foreign Application Priority Data

Dec. 31, 2009 (KR) .................. 10-2009-0135291

(51) Int. Cl.
*C08K 5/527* (2006.01)
(52) U.S. Cl. .......................................... 524/120
(58) Field of Classification Search ............ 524/120
See application file for complete search history.

(56) References Cited

U.S. PATENT DOCUMENTS

| | | | |
|---|---|---|---|
| 4,178,281 A * | 12/1979 | Horn, Jr. ............... | 524/120 |
| 4,692,488 A | 9/1987 | Kress et al. | |
| 5,061,745 A | 10/1991 | Wittmann et al. | |
| 2011/0152415 A1 | 6/2011 | Lee et al. | |

FOREIGN PATENT DOCUMENTS

EP 0728811 A2 8/1996

* cited by examiner

*Primary Examiner* — Peter Szekely
(74) *Attorney, Agent, or Firm* — Summa, Additon & Ashe, P.A.

(57) ABSTRACT

A polycarbonate resin composition comprises: about 30 to about 99% by weight of a polycarbonate resin (A); and about 1 to about 70% by weight of a rubber modified aromatic vinyl based copolymer resin (B); and about 0.1 to about 40 parts by weight of a phosphorous compound (C) including a phosphate compound (C1) and a phosphonate compound (C2), per 100 parts by weight of a base resin including (A) and (B). The polycarbonate resin composition can have excellent flame retardancy and improved heat resistance by using a combination of at least two different phosphorous compounds.

25 Claims, No Drawings

POLYCARBONATE RESIN COMPOSITION HAVING GOOD FLAME RETARDANCY

CROSS-REFERENCE TO RELATED APPLICATIONS

This application claims priority from Korea Patent Application No. 2009-0135291, filed on Dec. 31, 2009, in the Korean Intellectual Property Office, the disclosure of which is incorporated herein by reference in its entirety.

FIELD OF THE INVENTION

The present invention relates to a polycarbonate resin composition that can have good flame retardancy.

BACKGROUND OF THE INVENTION

Plastic polymers and synthetic resins have been used in various fields such as vehicles, building materials, aircrafts, railroads, home appliances, and the like. Further, various functional additives are being rapidly developed, which has increased the variety of applications for polymers. However, many polymers can burn easily and do not have fire resistance. Therefore, many polymers may be easily combusted by an exterior igniting source and may cause the fire to spread. Accordingly countries such as the United States, Japan and many European countries have passed laws requiring polymer resins to satisfy flame resistance standards to guarantee stability in the presence of a fire.

Various techniques can impart flame retardancy to polymers. Examples include synthesizing a thermally stable resin through molecule structure design, chemically improving a conventional polymer (reaction type), physically modifying a polymer by blending or compounding the polymer with a flame retardant agent (additive type) and coating or painting a polymer product with a flame retardant agent.

For example, many conventionally used and well known flame retardant methods add a flame retardant agent to a polymer resin. These additive type flame retardant agents can be classified according to their components and include halogen-containing, phosphorus-containing, nitrogen-containing, silicon-containing, and inorganic-containing flame retardant agents.

Halogen-containing flame retardant agents restrain chain reactions through a reaction with radicals that are generated in the gas during the combustion of polymers within a resin. Examples of halogen-containing compounds used to impart flame retardancy include polybromodiphenyl ether, tetrabromobisphenol-A, epoxy compounds substituted with bromine, chlorinated polyethylene and the like. Bromine-containing flame retardant agents are widely used as halogen-containing flame retardants in electronic applications because they can provide advantageous physical properties, price and flame retardancy. In addition, antimony trioxide or antimony pentaoxide are commonly used as additives in combination with halogen-containing flame retardant agents.

Bromine-containing flame retardant agents, however, may be harmful to humans and the environment. Due to the above, the Restriction of Hazardous Substances Directive (RoHS) was ratified in July 2006. Accordingly, a universally used bromine-containing flame retardant agent as known as DECA is partially being suspended from use, and the amount of the agent used is significantly decreasing.

Thus, with the concerns about the environmental impact of halogen-containing flame retardant agents, there is an increasing trend to use phosphorous flame retardant agents.

Classes of phosphorous flame retardant agents include phosphates, phosphine oxides, phosphonates, and the like. Phosphorous flame retardant agents can have excellent flame retardancy in a solid phase reaction, particularly for plastics with a high oxygen content. Further, phosphorous flame retardant agents can attain flame retardancy in combination with a char forming material such as polycarbonate resin or polyphenylene ether resin. Examples of typical flame retardant phosphorous compounds include aromatic phosphorous esters such as triphenylphosphate, resorcinol bisphenol phosphate, and the like.

U.S. Pat. No. 4,692,488 discloses a thermoplastic resin composition comprising non-halogen aromatic polycarbonate resin, non-halogen styrene-acrylonitrile copolymer, non-halogen phosphorous compound, tetrafluoroethylene copolymer and small amount of ABS copolymer. U.S. Pat. No. 5,061,745 discloses a flame retardant resin composition comprising aromatic polycarbonate resin, ABS graft copolymer, styrenic copolymer, phosphorous ester and tetrafluoroethylene copolymer. However, large amounts of phosphorous ester must be added in order to achieve flame retardancy.

SUMMARY OF THE INVENTION

The present invention provides a polycarbonate resin composition that can have good flame retardancy. The present invention also provides a polycarbonate resin composition that can have excellent heat resistance as well as good flame retardancy. The present invention further provides an environmentally-friendly flame retardant polycarbonate resin composition.

Exemplary polycarbonate resin compositions according to the present invention include: a base resin including a polycarbonate resin and a rubber modified aromatic vinyl based copolymer resin; and a phosphorous flame retardant agent. The phosphorous flame retardant agent includes two kinds of phosphorous compounds, a phosphate and a phosphonate. The resultant flame retardant polycarbonate resin composition can be used to produce products that can have good flame retardancy properties and can be useful in electronic and electrical applications.

In exemplary embodiments of the invention the polycarbonate resin composition that can have excellent flame retardancy includes: a base resin including (A) about 30 to about 99% by weight of a polycarbonate resin; and (B) about 1 to about 70% by weight of a rubber modified aromatic vinyl based copolymer resin; and (C) about 0.1 to about 40 parts by weight of a phosphorous compound including (C1) a phosphate compound represented by Formula 2 and (C2) a phosphonate compound represented by Formula 3, per 100 parts by weight of the base resin including (A) and (B).

The phosphprous compound (C) can include (C1) about 20 to about 80% by weight of a phosphate compound and (C2) about 20 to about 80% by weight of a phosphonate compound.

The resin composition of the invention may optionally further include one or more additives such as but not limited to a flame retardant, flame retarding aid, plasticizer, heat stabilizer, anti-dripping agent, antioxidant, light stabilizer, dye, pigment, inorganic filler, and the like, and combinations thereof.

DETAILED DESCRIPTION OF THE INVENTION

The present invention will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

A polycarbonate resin composition according to the present invention includes (A) about 30 to about 99% by weight of a polycarbonate resin; (B) about 1 to about 70% by weight of a rubber modified aromatic vinyl based copolymer resin; and (C) about 0.1 to about 40 parts by weight of a phosphorous compound including (C1) a phosphate compound and (C2) a phosphonate compound, per 100 parts by weight of a base resin including (A) and (B).

(A) Polycarbonate Resin

A polycarbonate resin of the present invention may be prepared by reacting one or more diphenols represented by Chemical Formula 1 with a phosgene, halogen formate and/or a carbonic diester.

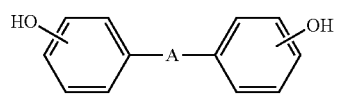

[Formula 1]

wherein A is a single bond, $C_{1-5}$ alkylene, $C_{1-5}$ alkylidene, $C_{5-6}$ cycloalkylidene, —S— or —$SO_2$—.

Examples of diphenols of Chemical Formula 1 may include without limitation hydroquinol, resocinol, 4,4'-dihydroxy diphenyl, 2,2-bis-(4-hydroxyphenyl)-propane, 2,4-bis-(4-hydroxyphenyl)-2-methyl buthane, 1,1-bis-(4-hydroxyphenyl)-cyclohexane, 2,2-bis-(3-chloro-4-hyroxyphenyl)-propane, 2,2-bis-(3,5-dichloro-4-hydroxyphenyl)-propane, and the like, and combinations thereof. In exemplary embodiments, the diphenol can include 2,2-bis-(4-hydroxyphenyl)-propane (also referred to as bisphenol-A or BPA), 2,2-bis-(3,5-dichloro-4-hydroxyphenyl)-propane, 1,1-bis-(4-hydroxyphenyl)-cyclohexane, and the like. In other exemplary embodiments, the diphenol can include 2,2-bis-(4-hydroxyphenyl)-propane.

The polycarbonate resin according to the present invention may have a weight average molecular weight (Mw) of about 10,000 to about 200,000, for example about 15,000 to about 80,000.

In accordance with various embodiments of the invention, suitable polycarbonates for use in the composition of the present invention may include without limitation linear polycarbonate resins, branched polycarbonate resins, polyestercarbonate resins, and the like, and combinations thereof. Suitable polycarbonates for use in the composition of the present invention may also include without limitation homopolycarbonates, copolycarbonates, and combinations thereof.

The polycarbonates may be prepared using methods known in the art. For example, the polycarbonate resin may be a linear polycarbonate such as a bisphenol-A-based polycarbonate resin. As another example, branched polycarbonates can be prepared in a known manner, such as by incorporating about 0.05 to about 2 mol %, based on the total quantity of diphenols used, of tri- or higher functional compounds, for example, those with three or more phenolic groups. As yet another example, the polycarbonate may be totally or partially substituted with an ester precursor using known techniques, for example an aromatic polyester-carbonate resin prepared by polymerization in the presence of a difunctional carboxylic acid.

In the present invention, the polycarbonate resin composition can include the polycarbonate resin (A) in an amount of about 30 to about 99% by weight, for example about 40 to about 90% by weight, as another example about 50 to about 80% by weight, and as another example about 60 to about 77% by weight, based on the total weight of a base resin comprising (A) and (B), wherein (A) is polycarbonate resin and (B) is a rubber modified aromatic vinyl based copolymer resin. In some embodiments, the base resin may include the polycarbonate resin (A) in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99% by weight. Further, according to some embodiments of the present invention, the amount of the polycarbonate resin (A) can be in a range from about any of the foregoing amounts to about any other of the foregoing amounts. Excellent flame retardancy and mechanical properties may be obtained when the composition includes the polycarbonate resin in an amount within the above ranges.

(B) Rubber Modified Aromatic Vinyl Based Copolymer Resin

The rubber modified aromatic vinyl based copolymer resin according to the present invention is a polymer resin wherein a rubbery polymer is dispersed in the form of particles in a matrix of an aromatic vinyl polymer. The rubber modified aromatic vinyl based copolymer resin can be prepared by polymerizing rubbery polymer, aromatic vinyl monomer, and optionally monomer polymerizable with the aromatic vinyl monomer. The rubber modified aromatic vinyl based copolymer resins can be prepared by known methods such as emulsion polymerization, solution polymerization, suspension polymerization, and bulk polymerization.

The rubber-modified aromatic vinyl based copolymer resin can be produced by preparing separately a graft copolymer resin typically having high rubber content and an aromatic vinyl copolymer resin which does not contain rubber and mixing them together. In bulk polymerization, the rubber modified aromatic vinyl based copolymer resin can be prepared in one process without separately preparing the graft copolymer resin and the aromatic vinyl copolymer resin. In either case, the rubber content in a final rubber modified aromatic vinyl based copolymer resin can range from about 1 to about 30% by weight, for example about 3 to about 20% by weight, and as another example about 5 to about 15% by weight, based on the total weight of a base resin. In some embodiments, the rubber content in a final rubber modified aromatic vinyl based copolymer resin can range from about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30% by weight. Further, according to some embodiments of the present invention, the rubber content in a final rubber modified aromatic vinyl based copolymer resin can be in a range from about any of the foregoing amounts to about any other of the foregoing amounts.

The Z-average particle size of the rubber in the rubber modified aromatic vinyl based copolymer resin can range from about 0.1 to 6.0 µm, for example about 0.25 to about 4 µm. In some embodiments, the Z-average particle size of the rubber can range from about 0.1, 0.2, 0.3, 0.4, 0.5, 0.6, 0.7, 0.8, 0.9, 1, 2, 3, 4, 5, or 6 µm. Further, according to some embodiments of the present invention, the Z-average particle size of the rubber can be in a range from about any of the foregoing sizes to about any other of the foregoing sizes.

Examples of the above resin may include without limitation acrylonitrile-butadiene-styrene copolymer resin (ABS), acrylonitrile-acryl rubber-styrene copolymer (AAS), acrylonitrile-ethylene/propylene rubber-styrene copolymer (AES), High Impact Polystyrene (HIPS) and the like. These can be used singly or as a combination of at least two or more thereof.

In the rubber modified aromatic vinyl based copolymer resin, the graft copolymer resin can be used alone or in combination with a copolymer resin which does not contain rubber, depending on the compatibility thereof.

In exemplary embodiments of the present invention, the rubber modified aromatic vinyl based copolymer resin comprises about 10 to about 100% by weight of a graft copolymer resin ($B_1$) and about 0 to about 90% by weight of a copolymer resin ($B_2$). In other exemplary embodiments of the present invention, the rubber modified aromatic vinyl based copolymer resin comprises about 55 to about 90% by weight of a graft copolymer resin ($B_1$) and about 10 to about 45% by weight of a copolymer resin ($B_2$). In other exemplary embodiments of the present invention, the rubber modified aromatic vinyl based copolymer resin comprises about 15 to about 50% by weight of a graft copolymer resin ($B_1$) and about 50 to about 85% by weight of a copolymer resin ($B_2$).

Further, in some embodiments, the rubber modified aromatic vinyl based copolymer resin (B) may include the graft copolymer resin ($B_1$) in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87 88, 89, 90, 91, 92, 93, 94, 95, 96, 97, 98, 99, or 100% by weight. Further, according to some embodiments of the present invention, the amount of the graft copolymer resin ($B_1$) can be in a range from about any of the foregoing amounts to about any other of the foregoing amounts.

Further, in some embodiments, the rubber modified aromatic vinyl based copolymer resin (B) may not include the copolymer resin ($B_2$) (i.e., the rubber modified aromatic vinyl based copolymer resin (B) may include 0% by weight of the copolymer resin ($B_2$)). In some embodiments, the copolymer resin ($B_2$) may be present in the rubber modified aromatic vinyl based copolymer resin (B), i.e., the rubber modified aromatic vinyl based copolymer resin (B) may include the copolymer resin ($B_2$) in an amount of greater than and/or about 0, 1, 2, 3, 4, 5, 6, 7, 8, 9, 10, 11, 12, 13, 14, 15, 16, 17, 18, 29, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90% by weight. Further, according to some embodiments of the present invention, the amount of the copolymer resin ($B_2$) can be in a range from about any of the foregoing amounts to about any other of the foregoing amounts.

The flame retardant polycarbonate resin composition can include the rubber modified aromatic vinyl based copolymer resin (B) in amount of about 1 to about 70% by weight, for example about 1 to about 50% by weight, and as another example about 5 to about 40 by weight, based on the total weight of a base resin comprising (A) and (B). In some embodiments, the flame retardant polycarbonate resin composition can include the rubber modified aromatic vinyl based copolymer resin (B) in an amount of about 1, 2, 3, 4, 5, 6, 7, 8, 9, 10, 11, 12, 13, 14, 15, 16, 17, 18, 29, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70% by weight. Further, according to some embodiments of the present invention, the amount of the rubber modified aromatic vinyl based copolymer resin (B) can be in a range from about any of the foregoing amounts to about any other of the foregoing amounts.

Exemplary graft copolymer resins ($B_1$) and copolymer resins ($B_2$) of the rubber modified aromatic vinyl based copolymer resin (B) are described in more detail below.

($B_1$) Graft Copolymer Resin

The graft copolymer resin ($B_1$) of the present invention may be prepared by polymerizing a rubbery polymer with a graft-copolymerizable aromatic vinyl monomer and optionally a monomer copolymerizable with the aromatic vinyl monomer.

Examples of the rubbery polymers may include without limitation diene rubbers such as polybutadiene, poly(styrene-butadiene), poly(acrylonitrile-butadiene), and the like; saturated rubbers in which hydrogen is added to the diene rubber; isoprene rubbers; chloroprene rubbers; acrylic rubbers such as polybutyl acrylic acid; ethylene-propylene rubbers; and terpolymers of ethylene-propylene-diene (EPDM), and the like, and combinations thereof. In exemplary embodiments, the rubber includes a diene, such as butadiene rubber.

The amount of rubbery polymer in the graft copolymer resin may be about 5 to about 65% by weight, for example about 10 to about 65% by weight, based on the total weight of the graft copolymer resin ($B_1$). In some embodiments, the amount of rubbery polymer in the graft copolymer resin can range from about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or 65% by weight. Further, according to some embodiments of the present invention, the amount of rubbery polymer can be in a range from about any of the foregoing amounts to about any other of the foregoing amounts.

The average size of the rubber particles can range from about 0.1 to about 4 μm taking into account the desired impact strength and appearance of the resin composition. In some embodiments, the average particle size of the rubber particles can range from about 0.1, 0.2, 0.3, 0.4, 0.5, 0.6, 0.7, 0.8, 0.9, 1, 2, 3, or 4 μm. Further, according to some embodiments of the present invention, the average particle size of the rubber particles can be in a range from about any of the foregoing sizes to about any other of the foregoing sizes.

Examples of the aromatic vinyl monomer may include without limitation styrene monomers such as styrene, α-methyl styrene, β-methyl styrene, p-methyl styrene, p-t-butyl-styrene, ethylstyrene, monochlorostyrene, dichlorostyrene, dibromostyrene and the like, and combinations thereof. In exemplary embodiments, the aromatic vinyl monomer includes styrene.

The aromatic vinyl monomer may be used in an amount of about 34 to about 94% by weight based on the total weight of the graft copolymer resin ($B_1$). In some embodiments, the aromatic vinyl monomer may be used in an amount of about 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87 88, 89, 90, 91, 92, 93, or 94% by weight. Further, according to some embodiments of the present invention, the amount of the aromatic vinyl monomer can be in a range from about any of the foregoing amounts to about any other of the foregoing amounts.

One or more kind of monomers copolymerizable with the aromatic vinyl monomer may also be included. Examples of the monomer copolymerizable with the aromatic vinyl monomer may include without limitation unsaturated nitrile monomers such as acrylonitrile, methacrylonitrile, and the like, and may be used alone or in a combination of two or more.

The amount of the monomers copolymerizable with the aromatic vinyl monomer, such as the unsaturated nitrile monomers described herein, can be about 1 to about 30% by weight, based on the total weight of the graft copolymer resin ($B_1$). In some embodiments, the monomer copolymerizable with the aromatic vinyl monomer may be used in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30% by weight. Further, according to some embodiments of the present invention, the amount of the monomer copolymerizable with the aromatic vinyl monomer can be in a range from about any of the foregoing amounts to about any other of the foregoing amounts.

The graft copolymer may further include a monomer to impart processability and heat resistance. Examples of monomers imparting processability and heat resistance may include without limitation acrylic acid, methacrylic acid, maleic anhydride, N-substituted maleimide, and the like, and combinations thereof.

The monomer imparting processability and heat resistance may be used in an amount of about 0 to about 15% by weight, based on the total weight of the graft copolymer resin ($B_1$). In some embodiments, the graft copolymer resin may not include the monomer imparting processability and heat resistance (i.e., the graft copolymer resin may include 0% by weight of the monomer imparting processability and heat resistance). In some embodiments, the monomer imparting processability and heat resistance may be present in the graft copolymer resin, i.e., the graft copolymer resin may include the monomer imparting processability and heat resistance in an amount of greater than and/or about 0, 1, 2, 3, 4, 5, 6, 7, 8, 9, 10, 11, 12, 13, 14, or 15% by weight. Further, according to some embodiments of the present invention, the amount of the monomer imparting processability and heat resistance can be in a range from about any of the foregoing amounts to about any other of the foregoing amounts.

($B_2$) Copolymer Resin

A copolymer resin of the present invention can be polymerized using the monomer composition described herein with regard to the graft copolymer, except for the absence of the rubbery polymer, and taking compatibility into account.

Examples of the aromatic vinyl monomer used in the copolymer resin may include without limitation styrene, α-methyl styrene, p-methyl styrene, p-t-butyl styrene, ethyl-styrene, monochlorostyrene, dichlorostyrene, dibromostyrene, vinyl naphthalene, and the like, and combinations thereof. In exemplary embodiments, the aromatic vinyl monomer can include styrene.

The aromatic vinyl monomer can be used in an amount of about 60 to about 90% by weight, based on the total weight of the copolymer resin ($B_2$). In some embodiments, the aromatic vinyl monomer may be used in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90% by weight. Further, according to some embodiments of the present invention, the amount of the aromatic vinyl monomer can be in a range from about any of the foregoing amounts to about any other of the foregoing amounts.

Examples of the monomer copolymerizable with the aromatic vinyl monomer may include without limitation unsaturated nitrile compounds such as acrylonitrile, methacrylonitrile, and the like, and may be used alone or in a combination of two or more.

The amount of the monomer copolymerizable with the aromatic vinyl monomer can be about 10 to about 40% by weight, based on the total weight of the copolymer resin ($B_2$). In some embodiments, the monomer copolymerizable with the aromatic vinyl monomer may be used in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40% by weight. Further, according to some embodiments of the present invention, the amount of the monomer copolymerizable with the aromatic vinyl monomer can be in a range from about any of the foregoing amounts to about any other of the foregoing amounts.

Examples of monomers imparting processability and heat resistance to the copolymer resin may include without limitation acrylic acid, methacrylic acid, maleic anhydride, N-substituted maleimide and the like, and combinations thereof. The amount of monomer imparting processability and heat resistance can be about 0 to about 30% by weight, based on the total weight of the copolymer resin ($B_2$). In some embodiments, the copolymer resin ($B_2$) may not include the monomer imparting processability and heat resistance (i.e., the copolymer resin may include 0% by weight of the monomer imparting processability and heat resistance). In some embodiments, the monomer imparting processability and heat resistance may be present in the copolymer resin ($B_2$), i.e., the copolymer resin may include the monomer imparting processability and heat resistance in an amount of greater than and/or about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30% by weight. Further, according to some embodiments of the present invention, the amount of the monomer imparting processability and heat resistance can be in a range from about any of the foregoing amounts to about any other of the foregoing amounts.

(C) Phosphorous Compound

Phosphorous compounds can have an excellent retardancy effect in a solid phase reaction, particularly in plastics with a high oxygen content. The thermoplastic resin composition of the present invention includes a combination of at least two different phosphorous compounds, which can improve flame retardancy as compared to a composition including a single one of the phosphorous compounds. In particular, the thermoplastic resin composition of the present invention includes a phosphorous compound (C1) having a structure represented by following Formula 2 and a phosphorous compound (C2) having a structure represented by following Formula 3 to impart flame retardancy to the composition. The phosphorous compound (C1) is a phosphate based compound and (C2) is a phosphonate based compound. The phosphorous compounds are used in combination to provide a synergistic effect and the combination can provide excellent retardancy and high heat resistance. The above phosphorous compound (C) can be prepared easily by the person skilled in the art.

In exemplary embodiments of the present invention, the (C) phosphorous compound comprises (C1) about 20 to about 80% by weight of phosphate based compound represented by Formula 2 and (C2) about 20 to about 80% by weight of phosphonate based compound represented by Formula 3.

In some embodiments, the (C) phosphorous compound may include the phosphate based compound represented by Formula 2 (C1) in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80% by weight. Further, according to some embodiments of the present invention, the amount of the phosphate based compound represented by Formula 2 (C1) can be in a range from about any of the foregoing amounts to about any other of the foregoing amounts.

In some embodiments, the (C) phosphorous compound may include the phosphonate based compound represented by Formula 3 (C2) in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80% by weight. Further, according to some embodiments of the present invention, the amount of the phosphonate based compound represented by Formula 3 (C2) can be in a range from about any of the foregoing amounts to about any other of the foregoing amounts.

The phosphate based compound (C1) and the phosphonate based compound (C2) are described in more detail below.

(C1) Phosphate Based Compound

The phosphate based compound (C1) includes a compound or a combination of compounds represented by the following Formula 2:

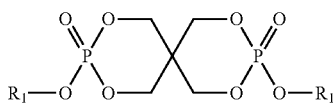

wherein each $R_1$ independently is $C_1$-$C_{10}$ alkyl, $C_6$-$C_{20}$ aryl, $C_1$-$C_{10}$ alkyl-substituted $C_6$-$C_{20}$ aryl or $C_7$-$C_{20}$ aralkyl.

The symmetrical phosphate based compound (pentaerythritol diphosphate) represented by Formula 2 can be prepared by the skilled artisan using methods known in the art.

For example, a pentaerythritol diphosphate may be prepared by reaction of pentaerythritol with phosphorous oxychloride, according to the following equation:

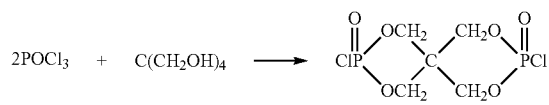

followed by the reaction of the above intermediate product with an alcohol or phenol, depending on the phosphorus additive desired. That reaction is illustrated by the equation:

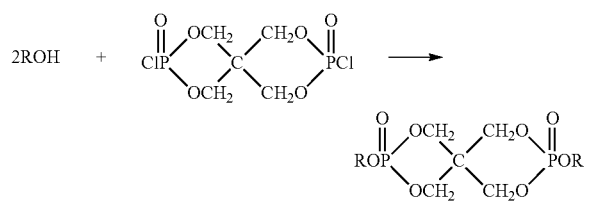

wherein R is $C_1$-$C_{10}$ alkyl, $C_6$-$C_{20}$ aryl, $C_1$-$C_{10}$ alkyl-substituted $C_6$-$C_{20}$ aryl or $C_7$-$C_{20}$ aralkyl.

The above phosphate based compound (C1) may be used singly or in combination of two or more. The phosphorous compound (C) can include the phosphate based compound (C1) in an amount of about 20 to about 80% by weight, for example about 30 to about 70% by weight, based on the total weight of the phosphorous compound (C).

If the amount of the phosphate based compound is less than about 20% by weight, flame retardancy and heat resistance of the thermoplastic resin composition may be reduced. If the amount of the phosphate based compound is more than about 80% by weight, the physical strength of the thermoplastic resin composition may be reduced.

(C2) Phosphonate Based Compound

The phosphonate based compound (C2) includes a compound or a combination of compounds represented by the following Formula 3:

wherein each $R_1$ independently is $C_1$-$C_{10}$ alkyl, $C_6$-$C_{20}$ aryl, $C_1$-$C_{10}$ alkyl-substituted $C_6$-$C_{20}$ aryl, $C_1$-$C_{10}$ alkoxy, $C_1$-$C_{10}$ alkoxy-substituted $C_6$-$C_{20}$ aryl or $C_7$-$C_{20}$ aralkyl.

The symmetrical phosphonate based compound (pentaerythritol diphosphonate) represented by Formula 3 can be prepared by the skilled artisan using methods known in the art.

For example, 1 equivalent (eq) of pentaerythritol, 2 equivalent (eq) of phenyl dichloride phosphonate and less than 0.1 equivalent (eq) of magnesium chloride can be added to 1,2-dichloroethane, and then the mixture can be reacted by a refluxing method. After the reaction is terminated, the mixture can be washed by phosphoric acid or hydrochloric acid having a concentration of less than 10% and then the water phase is eliminated completely through dehydration at 130° C. A sample can be collected from the product and an acid value thereof can be analyzed. Then, 3 to 5 equivalents of propylene oxide per acid value measured can be added to the product and reacted by a refluxing method for 0.1 to 5 hours. In addition, the product can be washed twice by water added therein and filtered to produce a diphenyl pentaerythritol diphosphonate.

The phosphate based compound (C2) of the present invention may be used singly or in combination of two or more. The phosphorous compound (C) can include the phosphonate based compound (C2) in an amount of about 20 to 80% by weight, for example about 30 to about 70% by weight, based on total weight of phosphorous compound (C).

The polycarbonate resin composition can include the phosphorous compound (C) comprising a combination of (C1) and (C2) in an amount of about 0.1 to about 40 parts by weight, for example about 1 to about 30 parts by weight, and as another example about 2 to about 20 parts by weight, based on 100 parts by weight of the base resin including (A) and (B) as described herein. In some embodiments, the polycarbonate resin composition can include the phosphorous compound (C) in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 parts by weight. Further, according to some embodiments of the present invention, the amount of the phosphorous compound (C) can be in a range from about any of the foregoing amounts to about any other of the foregoing amounts.

If the amount of the phosphorous compound (C) is less than about 0.1 parts by weight, sufficient flame retardancy may not be obtained. If the amount of the phosphorous compound (C) is more than about 40 parts by weight, properties such as impact strength may be reduced.

The polycarbonate resin composition may optionally include one or more additives, depending on the use of each and additional desired properties for the composition. Examples of such additives include without limitation plasticizers, flame retardant aids, anti-dripping agents, heat stabilizers, weather stabilizers, halogen stabilizers, lubricants, inorganic fillers, coupling agents, light stabilizers, antioxidants, dyes, pigments, antistatic agents, release agents, dispersants, weather stabilizers, inorganic fibers, and the like, and combinations thereof. Exemplary inorganic filler include without limitation talc, silica, mica, glass fiber, ceramics, sulfates, and the like, and combinations thereof. The additive(s) may be present in an amount of less than about 30 parts by weight, for example about 0.1 to about 30 parts by weight, based on 100 parts by weight of the base resin including (A) and (B) as described herein.

The polycarbonate resin composition according to the present invention can be prepared by a conventional method. For example, the components and optional additives can be mixed together and extruded through an extruder and can be prepared in the form of pellets or chips.

The polycarbonate resin composition of the present invention can have excellent flame retardancy and heat resistance and can be used in the production of various products including without limitation housings for electric and electronic goods such as TVs, audio devices, cellular phones, digital cameras, navigation systems, washing machines, computers, monitors, MP3 players, video players, CD players, and the like, as well as large-sized molded products.

Methods for preparing the plastic molded articles using the polycarbonate resin compositions of the present invention are not limited, and methods such as extrusion, injection molding or casting may be employed. Such methods are known in the art and be readily conducted by those skilled in the art.

The invention may be better understood by reference to the following examples which are intended for the purpose of illustration and are not to be construed as in any way limiting the scope of the present invention, which is defined in the claims appended hereto.

EXAMPLES

The following components are used:
(A) Polycarbonate resin
A bisphenol-A type polycarbonate resin made by Teijin Company of Japan (product name: PANLITE L-1250W) with a weight average molecular weight ($M_w$) of about 25,000 g/mol is used.
(B) Rubber modified aromatic vinyl based copolymer resin
A rubber reinforced styrenic resin made by Cheil Industries, Inc. of South Korea (product name: CHT) is used.
(C) Phosphorous compound
(C1) Phosphate based compound
(C 1-a) A phosphate compound of Formula 2 in which $R_1$ is phenyl is used.
(C1-b) A phosphate compound of Formula 2 in which $R_1$ is benzyl is used.
(C2) Phosphonate
(C2-a) A phosphonate compound of Formula 3 in which $R_1$ is phenyl is used.
(C2-b) A phosphonate compound of Formula 3 in which $R_1$ is benzyl is used.
(C2-c) A phosphonate compound of Formula 3 in which $R_1$ is para-methoxyphenyl is used.

Examples 1-12 and Comparative Examples 1-10

The components in amounts shown in the following Tables 1 and 2 are extruded through a conventional extruder at 200~280 C.° to prepare pellets. The prepared pellets are dried at 80 C.° for 2 hours and injected by 10 oz extruder under conditions of a molding temperature of 180~280 C.° and a tool temperature of 40~80 C.°. Then, samples are prepared.

Measurement of Physical Properties:
(1) Flame retardancy: The flame retardancy is measured according to UL 94 VB with a thickness of ⅛".
(2) Total burning time: When the flame retardancy is measured, total burning time is the sum of the first and second burning times for 5 specimens.
(3) Heat resistance: VST (Vicat Softening Temperature) is measured using a 5 kg pendulum according to ISO R 306.
(4) IZOD impact strength: Impact strength is measured according to ASTM D-256 with a thickness of ⅛" (kgf·cm/cm).

TABLE 1

| | | | Examples | | | | | |
|---|---|---|---|---|---|---|---|---|
| | | | 1 | 2 | 3 | 4 | 5 | 6 |
| (A) Polycarbonate resin | | | 70 | 70 | 70 | 70 | 70 | 70 |
| (B) Rubber modified aromatic vinyl based copolymer resin | | | 30 | 30 | 30 | 30 | 30 | 30 |
| (C) Phosphorous compound | (C1) Phosphate | (C1-a) | 4 | — | 4 | — | 4 | — |
| | | (C1-b) | — | 4 | — | 4 | — | 4 |
| | (C2) Phosphonate compound | (C2-a) | 4 | 4 | — | — | — | — |
| | | (C2-b) | — | — | 4 | 4 | — | — |
| | | (C2-c) | — | — | — | — | 4 | 4 |
| Total burning time | | | 13 | 27 | 14 | 21 | 16 | 23 |
| UL-94 | | | V-0 | V-0 | V-0 | V-0 | V-0 | V-0 |
| Heat resistance (C. °) | | | 120 | 129 | 119 | 121 | 124 | 123 |
| IZOD impact strength | | | 18 | 16 | 17 | 16 | 18 | 17 |

| | | | Examples | | | | | |
|---|---|---|---|---|---|---|---|---|
| | | | 7 | 8 | 9 | 10 | 11 | 12 |
| (A) Polycarbonate resin | | | 70 | 70 | 70 | 70 | 70 | 70 |
| (B) Rubber-modified aromatic vinyl based copolymer resin | | | 30 | 30 | 30 | 30 | 30 | 30 |
| (C) Phosphorous compound | (C1) Phosphate | (C1-a) | 2 | 6 | — | — | 2 | 6 |
| | | (C1-b) | — | — | 2 | 6 | — | — |
| | (C2) Phosphonate | (C2-a) | 6 | 2 | — | — | — | — |
| | | (C2-b) | — | — | 6 | 2 | — | — |
| | | (C2-c) | — | — | — | — | 6 | 2 |
| Total burning time | | | 34 | 40 | 31 | 34 | 38 | 37 |
| UL-94 | | | V-0 | V-0 | V-0 | V-0 | V-0 | V-0 |
| Heat resistance (C. °) | | | 118 | 117 | 117 | 119 | 120 | 121 |
| IZOD impact strength | | | 15 | 14 | 14 | 11 | 15 | 16 |

TABLE 2

| | | | Comparative examples | | | | |
|---|---|---|---|---|---|---|---|
| | | | 1 | 2 | 3 | 4 | 5 |
| (A) Polycarbonate resin | | | 70 | 70 | 70 | 70 | 70 |
| (B) Rubber-modified aromatic vinyl resin | | | 30 | 30 | 30 | 30 | 30 |
| (C) Phosphorous compound | (C1) Phosphate | (C1-a) | 8 | — | — | — | — |
| | | (C1-b) | — | 8 | — | — | — |
| | (C2) Phosphonate | (C2-a) | — | — | 8 | — | — |
| | | (C2-b) | — | — | — | 8 | — |
| | | (C2-c) | — | — | — | — | 8 |
| Total burning time | | | — | — | — | — | — |
| UL-94 | | | Fail | Fail | Fail | Fail | Fail |
| Heat resistance (C. °) | | | 104 | 108 | 107 | 114 | 117 |
| IZOD impact strength | | | 12 | 11 | 13 | 14 | 12 |

| | Comparative examples | | | | |
|---|---|---|---|---|---|
| | 6 | 7 | 8 | 9 | 10 |
| (A) Polycarbonate resin | 70 | 70 | 70 | 70 | 70 |
| (B) Rubber-modified | 30 | 30 | 30 | 30 | 30 |

TABLE 2-continued

| | | | | | | | |
|---|---|---|---|---|---|---|---|
| aromatic vinyl resin | | | | | | | |
| (C) | (C1) | (C1-a) | 10 | — | — | — | — |
| Phos-phorous compound | Phosphate compound (C2) | (C1-b) | — | 10 | — | — | — |
| | | (C2-a) | — | — | 10 | — | — |
| | Phos-phonate | (C2-b) | — | — | — | 10 | — |
| | | (C2-c) | — | — | — | — | 10 |
| Total burning time | | | — | — | — | — | — |
| UL-94 | | | Fail | Fail | Fail | Fail | Fail |
| Heat resistance (C. °) | | | 99 | 100 | 102 | 103 | 106 |
| IZOD impact strength | | | 10 | 9 | 10 | 11 | 11 |

As shown in Tables 1 and 2, Examples 1 to 12 which include a phosphorous compound which includes a combination of phosphate based resin (C1) and phosphonate based resin (C2) have better flame retardancy (⅛"), impact strength and heat resistance than Comparative Examples 1 to 10 which include a single of phosphate based resin (C1) or phosphonate based resin (C2).

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A polycarbonate resin composition that can have excellent flame retardancy comprising:
   a base resin comprising (A) about 30 to about 99% by weight of a polycarbonate resin; and (B) about 1 to about 70% by weight of a rubber modified aromatic vinyl based copolymer resin; and
   (C) about 0.1 to about 40 parts by weight of a phosphorous compound including (C1) about 20 to about 80% by weight of a phosphate compound represented by Formula 2 and (C2) about 20 to about 80% by weight of a phosphonate compound represented by Formula 3, per 100 parts by weight of a base resin including (A) and (B):

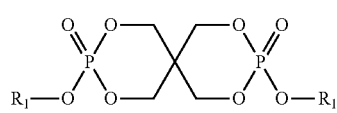

[Formula 2]

wherein each $R_1$ is independently $C_1$-$C_{10}$ alkyl, $C_6$-$C_{20}$ aryl, $C_1$-$C_{10}$ alkyl-substituted $C_6$-$C_{20}$ aryl, or $C_7$-$C_{20}$ aralkyl;

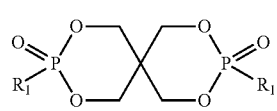

[Formula 3]

wherein each $R_1$ is independently $C_1$-$C_{10}$ alkyl, $C_6$-$C_{20}$ aryl, $C_1$-$C_{10}$ alkyl-substituted $C_6$-$C_{20}$ aryl, $C_1$-$C_{10}$ alkoxy, $C_1$-$C_{10}$ alkoxy-substituted $C_6$-$C_{20}$, or $C_7$-$C_{20}$ aralkyl.

2. The polycarbonate resin composition of claim 1, wherein each $R_1$ of Formula 2 is phenyl.

3. The polycarbonate resin composition of claim 1, wherein each $R_1$ of Formula 2 is benzyl.

4. The polycarbonate resin composition of claim 1, wherein each $R_1$ of Formula 3 is phenyl.

5. The polycarbonate resin composition of claim 1, wherein each $R_1$ of Formula 3 is benzyl.

6. The polycarbonate resin composition of claim 1, wherein each $R_1$ of Formula 3 is para-methoxyphenyl.

7. The polycarbonate resin composition of claim 1, wherein each $R_1$ of Formula 2 is phenyl and each $R_1$ of Formula 3 is phenyl.

8. The polycarbonate resin composition of claim 1, wherein each $R_1$ of Formula 2 is phenyl and each $R_1$ of Formula 3 is benzyl.

9. The polycarbonate resin composition of claim 1, wherein each $R_1$ of Formula 2 is phenyl and each $R_1$ of Formula 3 is para-methoxyphenyl.

10. The polycarbonate resin composition of claim 1, wherein the base resin comprises about 40 to about 90% by weight of the polycarbonate resin.

11. The polycarbonate resin composition of claim 10, wherein the base resin comprises about 50 to about 80% by weight of the polycarbonate resin.

12. The polycarbonate resin composition of claim 11, wherein the base resin comprises about 60 to about 77% by weight of the polycarbonate resin.

13. The polycarbonate resin composition of claim 1, wherein the base resin comprises about 1 to about 50% by weight of the rubber modified aromatic vinyl based copolymer resin.

14. The polycarbonate resin composition of claim 3, wherein the base resin comprises about 5 to about 40% by weight of the rubber modified aromatic vinyl based copolymer resin.

15. The polycarbonate resin composition of claim 1, wherein the rubber modified aromatic vinyl based copolymer resin (B) comprises:
   ($B_1$) about 10 to 100% by weight of a graft copolymer resin prepared by graft-copolymerizing about 5 to about 65% by weight of a rubbery polymer, about 34 to about 94% by weight of an aromatic vinyl monomer, about 1 to about 30% by weight of a monomer copolymerizable with said aromatic vinyl monomer, and about 0 to about 15% by weight of a monomer imparting processability and heat resistance; and
   ($B_2$) about 0 to about 90% by weight of a copolymer resin prepared by copolymerizing about 60 to about 90% by weight of an aromatic vinyl monomer, about 10 to about 40% by weight of a monomer copolymerizable with said aromatic vinyl monomer, and about 0 to about 30% by weight of a monomer imparting processability and heat resistance.

16. The polycarbonate resin composition of claim 15, wherein the rubber modified aromatic vinyl based copolymer resin (B) comprises:
   ($B_1$) about 55 to about 90% by weight of the graft copolymer resin; and
   ($B_2$) about 10 to about 45% by weight of the copolymer resin.

17. The polycarbonate resin composition of claim 15, wherein the rubber modified aromatic vinyl based copolymer resin (B) comprises:
   ($B_1$) about 15 to about 50% by weight of the graft copolymer resin; and (B2) about 50 to about 85% by weight of the copolymer resin.

18. The polycarbonate resin composition of claim 15, wherein:
said aromatic vinyl monomer comprises styrene, α-methylstyrene, β-methylstyrene, p-methylstyrene, para t-buthylstyrene, ethylstyrene, monochlorostyrene, dichlorostyrene, dibromostyrene or a combination thereof;
said monomer copolymerizable with said aromatic vinyl monomer comprises an unsaturated nitrile-containing compound; and
said monomer imparting processability and heat resistance comprises acrylic acid, methacrylic acid, maleic anhydride, N-substituted maleimide or a combination thereof.

19. The polycarbonate resin composition of claim 1, comprising about 1 to about 30 parts by weight of said phosphorous compound (C).

20. The polycarbonate resin composition of claim 19, comprising about 2 to about 20 parts by weight of said phosphorous compound (C).

21. The polycarbonate resin composition of claim 1, wherein said resin composition further comprises one or more additives selected from the group consisting of flame retardants, flame retardant aids, plasticizers, heat stabilizers, anti-dripping agents, antioxidants, light stabilizers, dyes, pigments, inorganic fillers, weather stabilizers, lubricants, coupling agents, antistatic agents, release agents, dispersants, and combinations thereof.

22. A plastic article prepared by the resin composition of claim 1.

23. The polycarbonate resin composition of claim 1, comprising about 0.1 to about 8 parts by weight of a phosphorous compound (C).

24. The polycarbonate resin composition of claim 23, wherein the composition has a flame retardancy of V-0 measured in accordance with UL-94 (1/8" thickness).

25. The polycarbonate resin composition of claim 23, wherein the composition does not include a halogenated flame retardant.

* * * * *